United States Patent Office 3,118,907
Patented Jan. 21, 1964

3,118,907
3-SUBSTITUTED-3-PYRROLIDINOLS
Yao Hua Wu, Rolland Frederick Feldkamp, and William Andrew Gould, Evansville, Ind., assignors to Mead Johnson & Company, Evansville, Ind., a corporation of Indiana
No Drawing. Filed Aug. 14, 1961, Ser. No. 131,068
6 Claims. (Cl. 260—326.5)

This patent application is concerned with compositions comprising 3-(3,4-dichlorophenyl)-3-pyrrolidinols, the acid addition salts of these substances, processes for their production, and their use in the treatment of certain disease conditions. These pyrrolidinols have the following formula

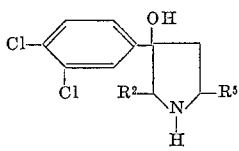

In this formula, $R^2$ and $R^5$ are each independently selected from the group consisting of lower alkyl and lower alkenyl groups having up to about four carbon atoms such as methyl, ethyl, allyl, butyl, isobutyl, t-butyl, butenyl, isopropyl, propenyl, etc. This application is a continuation-in-part of our copending patent application Serial No. 2571, filed January 15, 1960, which in turn is a continuation-in-part of our previously filed application Serial No. 792,712, filed February 12, 1959, and now abandoned.

The compounds of the present invention have utility as therapeutic agents. They are characterized by a broad variety of pharmacological properties, including vasopressor-depressor effects, coronary dilator activity, peripheral vasodilator and vasoconstrictor activity, papaverine-like smooth muscle depressant effects, and central nervous system stimulating effects. These substances depress many types of mammalian smooth muscles, including the normal actions and spastic states thereof. They do not function by hormonal blocking action such as cholinergic or adrenergic blocking action, but have a direct effect on smooth muscle and have the property of relaxing such muscle in the spastic state, regardless of the agent or hormone responsible for the condition. They have uterine relaxant, bronchodilator, intestinal antispasmodic, coronary dilator, ureteral relaxant, and other useful effects on administration to mammalian hosts suffering from spastic conditions. They also have substantial central nervous stimulating activity and are thus useful as psychotherapeutics.

They may be administered by the oral or parenteral routes in doses ranging from 3 to 120 mg./kg. of body weight. Various types of pharmaceutical dosage formulations may be employed, including tablets, capsules, elixirs, solutions, suspensions, etc. The formulation may contain a compound of the present invention as the sole active ingredient or other active ingredients may be included to provide complementary pharmacological effects therewith. Compositions in dosage unit from containing compounds of the present invention are prepared by conventional pharmaceutical methods. For this purpose, both solid and liquid carriers, excipients, and diluents may be used, along with suspending agents, stabilizers, preservatives, lubricants, etc., as needed. Examples of suitable carriers include corn starch, lactose, calcium phosphate, polyethylene glycol, water, sesame oil, peanut oil, propylene glycol, ethanol, etc.

Dosage unit forms such as tablets or capsules for oral use and ampoules of suspensions or solutions for injection containing from 100 to 400 mg. of active ingredient are ordinarily suitable. The physician, however, will determine the specific dosage form, size, and frequency of administration for each individual patient. The range for suitable dosages has been stated above. Individual doses of the order of 100 to 400 mg. are preferred.

The compounds of the present invention are prepared from the corresponding 1-acyl or 1-carbalkoxy-3-pyrrolidinols having the following formula

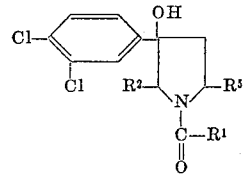

In the above formula, $R^2$ and $R^5$ have the same meaning as indicated above, and $R^1$ is a lower alkyl or lower alkoxy group having up to about four carbon atoms. These intermediates are prepared as described in copending application Serial No. 109,269, now Patent 3,083,208, filed May 11, 1961, by Wu, Feldkamp, and Lobeck, which in turn is a continuation-in-part of application Serial No. 792,711, now abandoned, filed February 12, 1959. The process is carried out by hydrolysis or alcoholysis of these intermediates in the presence of a strongly alkaline material such as sodium methoxide, potassium t-butoxide, sodium hydroxide, potassium hydroxide, or calcium oxide, alkoxide, or hydroxide. Strong acid conditions are usually to be avoided, since dehydration with loss of the 3-hydroxyl group sometimes occurs. The reaction is conveniently carried out by treatment of the 1-acyl-3-aryl-3-pyrrolidinol with potassium hydroxide in refluxing aqueous n-propanol.

The pharmaceutically acceptable acid addition salts are prepared by reaction of the present pyrrolidinols with a molar equivalent of an appropriate acid. Again, treatment with a large excess of a strong acid is to be avoided as are high temperatures. For example, the pyrrolidinol may be dissolved in ether or other suitable solvent and treated with one equivalent of the desired acid. Pharmaceutically acceptable salts include the hydrobromides, hydrochlorides, hydroiodides, sulfates, phosphates, acetates, citrates, gluconates, succinates, tartrates, mucates, benzoates, etc.

The compounds of the present invention each contain one, two, three, or more asymmetric carbon atoms, and, therefore, are capable of existing in various isomeric forms, including optical isomers and diastereoisomers. Each of these forms is included within the scope of the present invention as are mixtures thereof.

The following examples are provided to illustrate the preparation of specific compounds of the present invention. The scope of the invention is not to be considered as limited to these specific embodiments, however.

*Example 1*

A solution made up of 25 g. of potassium hydroxide dissolved in 50 ml. of n-propyl alcohol and 50 ml. of 10 N aqueous potassium hydroxide is prepared and 0.1 mole of 3-(3,4-dichlorophenyl)-1-carbethoxy-3-pyrrolidinol (application Serial No. 109,269) is added thereto. The mixture is stirred at the reflux temperature for 20 hrs. The flask and contents are then cooled resulting in the formation of two immiscible layers in the reaction vessel. The alcoholic layer is separated and diluted with 400 ml. of diisopropyl ether. The ethereal solution is then dried over anhydrous magnesium sulfate, the drying agent removed by filtration, and the filtrate neutralized with ethanolic hydrogen chloride. 3-(3,4-dichlorophenyl)-3-pyrrolidinol hydrochloride separates as a precipitate. It is collected on a filter, washed, and dried. This product is then recrystallized repeatedly from isopropyl alcohol-diisopropyl ether until samples from successive crystallizations have the same melting point, M.P. 182–184° C.; yield, 95%. On microanalysis by standard techniques, this substance is observed to have the following composition, carbon 45.04%; hydrogen, 4.78%; chlorine, 13.26%. These values are in substantial agreement from those calculated from the empirical formula. This substance exhibits infrared absorption maxima at the following wave lengths: 1025, 1100, 1490, 1600, 2780, 2880, 2920, 3050, and 3300 cm.$^{-1}$ (potassium bromide pellet).

*Example 2*

The procedure of Example 1 is applied to 1-carbethoxy-2 - methyl-3-(3,4-dichlorophenyl)-3-pyrrolidinol (application Serial No. 109,269) with the formation of 2-methyl-3-(3,4-dichlorophenyl)-3-pyrrolidinol hydrochloride; recrystallized from isopropanol-diisopropyl ether, M.P. 263–265° C.; yield, 90%; observed composition: carbon, 67.39%; hydrogen, 7.00%; nitrogen, 4.40%. The infrared absorption maxima are the same as indicated in Example 1.

*Example 3*

The procedure of Example 1 is applied to 1-carbethoxy-3 - (3,4-dichlorophenyl)-5-methyl-3-pyrrolidinol (application Serial No. 109,269) with the formation of 3-(3,4-dichlorophenyl) - 5 - methyl-3-pyrrolidinol hydrochloride, recrystallized from isopropanol-diisopropyl ether, M.P. 185–187° C.; yield, 90%; observed composition: 46.75% carbon, 4.99% hydrogen, and 12.54% chlorine. This substance exhibits the same infrared absorption maxima as listed in Example 1.

*Example 4*

(A) *1,4 - dicarbethoxy - 5-isopropyl-3-pyrrolidinone.*—Ethyl-N-carbethoxyglycine, 87.6 g. (0.5 mole) is added dropwise with stirring to a suspension of 24.0 g. (0.5 mole) of sodium hydride (51.5% pure) in 500 ml. of anhydrous benzene at such a rate as to maintain gentle reflux of the solvent. The solution is then heated at reflux for an additional 30 min. to insure completion of reaction, and 0.5 mole of ethyl 4-methyl-2-pentenoate dissolved in 100 ml. of anhydrous benzene is added in dropwise fashion to the hot reaction mixture. The reaction mixture is refluxed for 3 hrs. after completion of the addition of this reactant. It is then cooled and 167 ml. of 3 N hydrochloric acid is added thereto, and the immiscible layers separated. The aqueous layer is extracted with chloroform, and the chloroform extract combined with the benzene layer. The combined organic solvent solutions are dried over anhydrous magnesium sulfate, the drying agent removed by filtration, and the solvent distilled therefrom in vacuo. A viscous liquid remains, which is distilled in vacuo and then treated as described below.

(B) *1 - carbethoxy-5-isopropyl-3-pyrrolidinone.* — The 1,4-dicarbethoxy compound prepared above, 0.2 mole, is refluxed with stirring for 24 hrs. with 200 ml. of water containing 2 ml. of concentrated hydrochloric acid. The cooled reaction mixture is then saturated with sodium chloride and extracted with ether. The ether extracts are dried over anhydrous magnesium sulfate, the drying agent removed by filtration, and the solvent distilled from the filtrate in vacuo. The residue is distilled in vacuo, yielding the purified intermediate, 1-carbethoxy-5-isopropyl-3-pyrrolidinone, boiling point 85–86° C./10 mm. Hg; $n_D^{26}$ =1.4630; yield, 93%. *Analysis.*—Found, 6.99% nitrogen.

(C) *1 - carbethoxy-3-(3,4-dichlorophenyl)-5-isopropyl-3-pyrrolidinol.*—The Grignard reagent is prepared from 0.15 mole of 3,4-dichlorobromobenzene dissolved in 100 ml. of ether and 0.15 gram atom of magnesium turnings. A solution of 1-carbethoxy-5-isopropyl-3-pyrrolidinone, 0.1 mole, in 50 ml. of anhydrous ether is added in dropwise fashion to the ethereal Grignard reagent. The mixture is then refluxed for 4 hrs., cooled, and poured into 400 g. of ice containing 20 g. of ammonium chloride. After a portion of the ice melts the ether layer is separated and the aqueous layer extracted several times with ether. The combined ethereal solutions are dried over anhydrous magnesium sulfate, the drying agent removed by filtration, and the solvent removed by distillation. The residue is recrystallized and then employed for further transformation as described below.

(D) *3 -(3,4-dichlorophenyl)-5-isopropyl-3-pyrrolidinol hydrochloride.* — 1-carbethoxy-3-(3,4-dichlorophenyl)-5-isopropyl-3-pyrrolidinol prepared in the preceding step is converted by hydrolysis, according to the procedure of Example 1 to 3-(3,4-dichlorophenyl)-5-isopropyl-3-pyrrolidinol hydrochloride.

Substitution of 1-carbethoxy-2,5-dimethyl-3-pyrrolidinone or 1-carbethoxy-2-ethyl-5-methyl-3-pyrrolidinone as starting materials in the procedures of Examples 4 C. and D. yields 2,5-dimethyl-3-(3,4-dichlorophenyl)-3-pyrrolidinol hydrochloride, and 2-ethyl-5-methyl-3-(3,4-dichlorophenyl)-3-pyrrolidinol hydrochloride.

*Example 5*

A mixture of 100 g. of D,L-2-amino-4-pentenoate and 450 ml. of anhydrous ethanol containing 3 molar proportions of hydrogen chloride is refluxed for 5 hrs. The bulk of the solvent and excess hydrogen chloride are then removed by evaporation at reduced pressure, additional ethanol added to the syrup-like residue, the solvent again removed by distillation, and the residue dissolved in 200 ml. of water. The flask containing aqueous reaction mixture is then cooled in an ice bath and carefully neutralized with 10 N aqueous sodium hydroxide. One molar proportion of ethyl chloroformate is then added with stirring to the aqueous mixture of ethyl D,L-2-amino-4-pentenoate during a 2 hr. period. An additional hour is allowed for completion of the reaction, and the mixture is then stirred with 320 ml. of 20% aqueous sodium carbonate solution for 10 minutes. It is then extracted with several portions of ether, the ether extracts combined, dried, the drying agent removed, the solvent distilled, and the desired ethyl D,L-2-carbethoxyamino-4-pentenoate intermediate distilled in vacuo. This material is then allowed to react with ethyl acrylate under the reaction conditions of Example 4A, and the resulting 1,4-dicarbethoxy-2-allyl-3-pyrrolidinone converted according to the procedures of Examples 4 B, C, and D to 2-allyl-3-(3,4-dichlorophenyl)-3-pyrrolidinol hydrochloride.

*Example 6*

Tablets containing 2-methyl-3-(3,4-dichlorophenyl)-3-pyrrolidinol hydrochloride are prepared as follows:

| Ingredients | Weight per Tablet, mg. | Weight per 100,000 Tablets, kg. |
|---|---|---|
| 2-Methyl-3-(3,4-dichlorophenyl)-3-pyrrolidinol hydrochloride | 200 | 20.0 |
| Calcium Phosphate, Dibasic | 100 | 10.0 |
| Lactose | 70 | 7.0 |
| Starch, Corn | 28 | 2.8 |
| Magnesium Stearate | 2 | 0.2 |
| Total Weight | 400 | 40.0 |

For a 100,000 tablet batch the above amounts of 2-methyl-3-(3,4-dichlorophenyl)-3-pyrrolidinol hydrochloride, calcium phosphate, lactose and 2.2 kg. of the corn starch are dry blended and then wet granulated with 6 kg. of 10% aqueous corn starch paste. The resulting granulation is screened, dried, and rescreened. The granules are then coated with the magnesium stearate, which serves as a tableting lubricant, and the finished granules are compressed into tablets weighing 400 mg. each, using ordinary tableting equipment and methods.

Example 7

A dry blend of the following ingredients is prepared:

| | Kg. |
|---|---|
| 3 - (3,4 - dichlorophenyl)-5-methyl-3-pyrrolidinol hydrochloride | 20.0 |
| Lactose | 4.8 |
| Magnesium stearate | 0.2 |
| Total | 25.0 |

This mixture is then employed to fill No. 2 hard gelatin capsules, each with 250 mg. of the blend.

Example 8

A solution for injection is prepared as follows: 3-(3,4-dichlorophenyl)-3-pyrrolidinol hydrochloride, 500 g., is dissolved in 9 l. of water for injection, U.S.P. The pH of the solution is adjusted to 5.7±0.1, using dilute aqueous sodium hydroxide or hydrochloric acid as required. The solution is then diluted to 10 l. with water for injection, U.S.P. It is filtered sparkling clear, and 2 ml. thereof is filled into each of a group of ampoules made of Type I glass and sealed. The sealed ampoules are sterilized by heating in an autoclave at 121° C. for 15 minutes. This solution is suitable for intravenous injection.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

What is claimed is:

1. A compound selected from the group consisting of

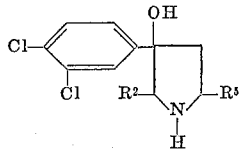

and the pharmaceutically acceptable acid addition salts thereof wherein $R^2$ and $R^5$ are each independently selected from the group consisting of hydrogen, lower alkyl and lower alkenyl groups having up to four carbon atoms.

2. 3-(3,4-dichlorophenyl)-3-pyrrolidinol.

3. A compound as claimed in claim 1 wherein $R^2$ is lower alkyl and $R^5$ is hydrogen.

4. 2-methyl-3-(3,4-dichlorophenyl)-3-pyrrolidinol.

5. A compound as claimed in claim 1 wherein $R^2$ is hydrogen and $R^5$ is lower alkyl.

6. 3-(3,4-dichlorophenyl)-5-methyl-3-pyrrolidinol.

References Cited in the file of this patent

UNITED STATES PATENTS

| 2,852,526 | Villani et al. | Sept. 16, 1958 |
| 2,878,264 | Lunsford | Mar. 17, 1959 |
| 2,902,404 | Spencer | Sept. 1, 1959 |
| 2,976,213 | Murphey | Mar. 21, 1961 |

OTHER REFERENCES

Wagner Zook: "Synthetic Organic Chemistry," page 415 (1953), John Wiley & Sons, Inc.